UNITED STATES PATENT OFFICE 2,393,271

HALOGEN DERIVATIVES OF SCHIFF'S BASES HAVING A BACTERICIDAL ACTION

James R. Shelton, Cleveland Heights, Ohio

No Drawing. Application October 19, 1942,
Serial No. 462,516

4 Claims. (Cl. 260—239.6)

This invention relates as indicated to bactericides. It is a principal object of my invention to provide bactericides which upon contact with water will release free halogen. It is a more particular object of my invention to provide bactericides which, in addition to liberating free halogen upon contact with water, also include in their molecular structure an organic nucleus which is, itself, effective as a chemotherapeutic agent so that the action of the more specific embodiments of my invention is actually two-fold.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the discovery of the utility as bactericides of organic halogen compounds of the type liberating free halogen upon hydrolysis, and having the formula:

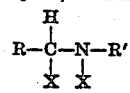

where R and R' are the same or different organic radicals and X is a halogen.

It is believed that the nature of the bactericides comprising my invention may be best explained by having reference to a preferred species, and its mode of preparation, and to then indicate such variations as may be made in the preparation of other specific examples representative of the generic class above identified.

About 17.2 grams of sulfanilamide were dissolved in about 100 cc. of boiling ethyl alcohol, and to this solution were added about 15.2 grams of vanillin. After refluxing for about one hour the reaction mixture was permitted to cool and crystallize. The solid vanillylidene sulfanilamide was filtered off and washed with both alcohol and ether, yielding about 21 grams of yellow crystals with a melting point of about 198–199° C. (uncorrected). The formula for sulfanilamide is as follows:

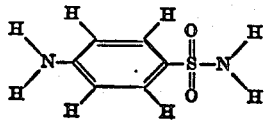

The formula for vanillin is as follows:

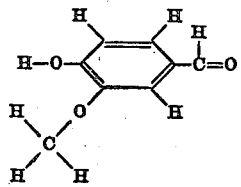

The vanillylidene sulfanilamide produced by the foregoing reaction has the following structural formula:

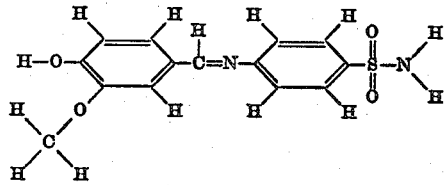

About 15.3 grams of a vanillylidene sulfanilamide were suspended in about 500 cc. of boiling absolute alcohol and 14 grams of iodine (a theoretical excess of about 10%) were added. Complete solution resulted and the solution was filtered hot in order to insure removal of any insoluble matter which might be present in the deeply colored solution.

Most of the alcohol was then removed by fractional distillation, and the remaining solvent distilled off under reduced pressure. The dark colored solid residue was covered with anhydrous ether and after standing for several hours the product was broken up into fine particles and thoroughly extracted with two more portions of dry ether. After collection on a filter, the product was placed in a vacuum desiccator to remove the last traces of solvent. A yield of 21 grams of brown powder was obtained with a melting point of about 183–4° C. (uncorrected). This halogen bearing product has the following structural formula:

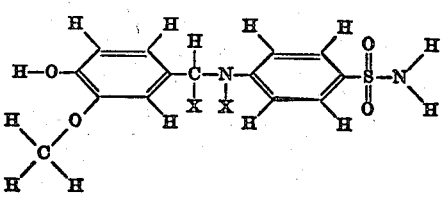

where X is a halogen, in the specific example given above being iodine.

The iodine containing product is insoluble in chloroform and imparted no color to it until water was added, whereupon an iodine color quickly developed. The liberation of iodine by this compound on contact with water may be followed quantitatively by titration with standard thiosulfate solution.

Instead of using vanillin as the reagent in the first reaction given above other aldehydes may be employed. However, the aromatic aldehydes are preferred, and in this connection it should be noted that satisfactory results have been secured by using benzaldehyde. Other aromatic aldehydes which may be employed are the following:

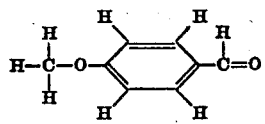

p-Methoxybenzaldehyde (anisaldehyde)

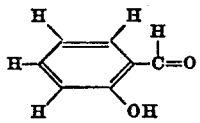

Salicylaldehyde

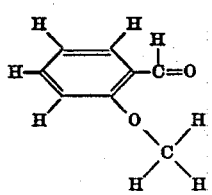

o-Methoxylbenzaldehyde

In the examples of the aromatic aldehydes given above it will be observed that halogen may be present in the aldehyde nucleus. The class of aliphatic aldehydes as a whole, although usable, are not generally preferred. The following are examples of aliphatic aldehydes that may be employed:

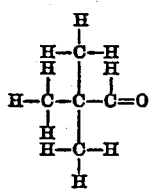

Trimethylacetaldehyde

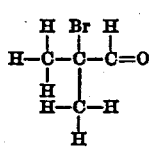

α—Bromo isobutyraldehyde

If an aliphatic aldehyde is used, the same should have its alpha position blocked so that upon hydrolysis of the halogen-containing end product, the halogen will be liberated as free halogen instead of attaching at the alpha position. However, with iodine substitution it is not as apt to occur. Hence, it is not essential in all cases to have the alpha carbon blocked, but mainly in those cases where a more active halogen, such as chlorine or bromine, are employed.

Instead of using an aldehyde as a reaction material in the preparation of the products of my invention, other carbonyl compounds may be used, as for example the ketones, such as:

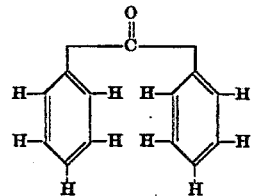

Diphenyl ketone (benzophenone)

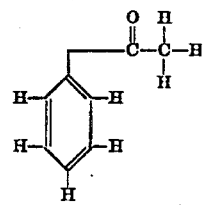

Phenyl methyl ketone (acetophenone)

It will be observed that the nucleus of the halogen-containing end product above identified is the unsubstituted sulfanilamide nucleus, viz.,

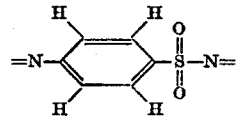

This embodiment of my generic invention is particularly preferred since the unsubstituted sulfanilamide nucleus serves as a chemotherapeutic agent simultaneously with the liberated free halogen which serves as a bactericide. Instead of starting with sulfanilamide as one of the components of the initial reaction, other sulfanilamide derivatives may be employed, such as for example:

Sulfapyridine:

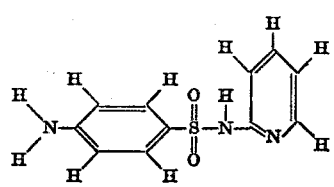

Sulfathiazole:

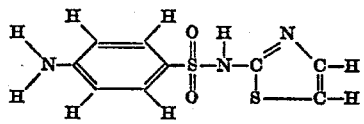

Sulfadiazine:

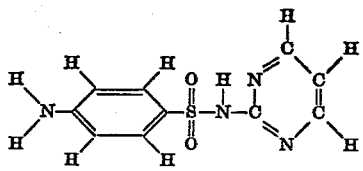

Sulfaguanidine:

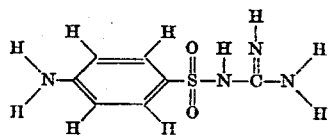

It is believed that from the characterizing reactions given in connection with the specific example, the nature of the end products using these last named sulfanilamide derivatives will be sufficiently apparent to those skilled in the art so that the structural formula and other more particular properties of the end products need not be given. Instead of iodine, the other halogens, preferably chlorine and bromine may be employed, although for most uses iodine will be found preferable.

The type of materials above referred to are, as indicated, characterized by their conjoint function as a bactericide due to their liberation of free halogen on contact with water and as a chemotherapeutic agent due to the presence therein of the unsubstituted sulfanilamide nucleus. Other compounds representative of the generic invention, but which do not necessarily possess this dual function may be prepared by using any amine in place of the sulfanilamide in the initial reaction given above. These products will be excellent bactericides, although will generally not be as effective as those previously given since they do not contain the sulfanilamide nucleus.

The following is a list of representative amines which may be employed for the purpose just stated. To prevent nuclear halogenation, the para position should be blocked.

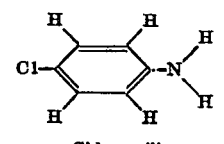
p-Chloroaniline

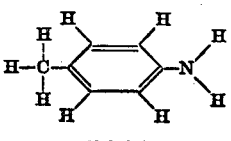
p-Toluidine

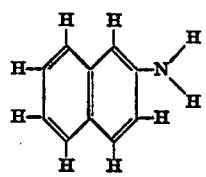
β-Naphthylamine

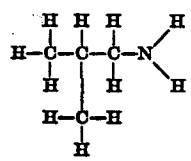
Isobutylamine

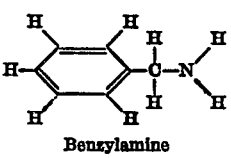
Benzylamine

It should be observed that in the formula given above in the broad statement of my invention R may be either aromatic or aliphatic, providing that if aliphatic the alpha position is blocked as and for the reasons previously given. Similarly R' may be either aromatic or aliphatic. However, if aromatic the para position should be blocked, and if aliphatic the alpha position preferably should be blocked so that upon contact with water the halogen liberated will not recombine but will be available as free halogen for its bactericidal function. The alpha position of the aliphatic amine need not be blocked, e. g.,

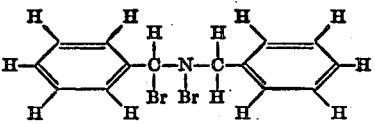

upon contact with water liberates $Br_2$. Similarly in the case of isobutylamine, no substitution on the alpha carbon atom is noted. However, if the alpha position is adjacent to a highly negative group, a hydroxyl group, or a carbonyl group, substitution in the alpha position readily occurs.

From the foregoing it will be observed that I have provided an improved type of organic halogen compound which will liberate free halogen not only on contact with water but also when the compound is subjected to other conditions, such as high temperatures and the like. While these compounds are, as stated, effective bactericides, they may, nevertheless, be used for any other purpose where the liberation of free halogen is a desirable characteristic. For example, certain lubricating compositions which rely upon the liberation of free halogen for extreme pressure effects may be prepared by the inclusion in lubricating oils of small amounts of the compounds referred to herein.

Other modes of applying the principle of the invention may be employed, change being made as regards the details described, provided the features stated in any of the following claims or the equivalent of such be employed.

I, therefore, particularly point out and distinctly claim as my invention:

1. As a new bactericide, an organic halogen compound of the type liberating free halogen upon contact with water and containing the structure:

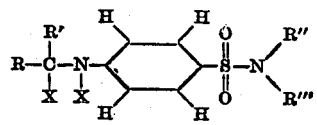

where R is a member of the group consisting of phenyl, alkoxy and hydroxy substituted phenyl and aliphatic radicals in which the attaching carbon atom has all its valences satisfied by a member of the group consisting of alkyl and halogen radicals, where R'' and R''' is each a member of the group consisting of hydrogen, pyridine, thiazole, diazine and guanidine and R' is a member of the group consisting of hydrogen, alkyl and aromatic radicals and X is a halogen.

2. A composition in accordance with claim 1 in which R'' is hydrogen.

3. As a new bactericide, vanillylidene sufanilamide iodinated, having the following structure:

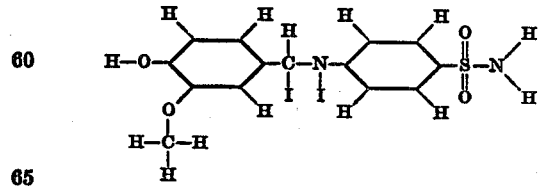

4. As a new bactericide, anisal-sulfadiazine iodinated, having the following structure:

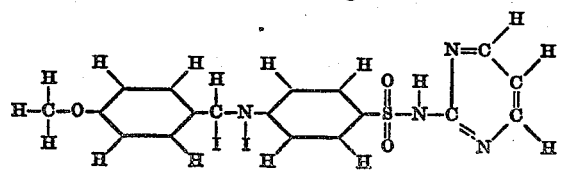

JAMES R. SHELTON.